United States Patent
Crespo et al.

(10) Patent No.: US 11,988,762 B2
(45) Date of Patent: May 21, 2024

(54) SYSTEMS AND METHODS FOR IDENTIFYING A SOURCE OF RADIO FREQUENCY INTERFERENCE IN A WIRELESS NETWORK

(71) Applicant: Verizon Patent and Licensing Inc., Basking Ridge, NJ (US)

(72) Inventors: Hector Alejandro Garcia Crespo, North Richland Hills, TX (US); Matthew Kapala, North Billerica, MA (US); Jason A. Birr, Wesley Chapel, FL (US); Ricardo Francisco Borges, Noblesville, IN (US); Brian A. Ward, Fort Worth, TX (US); Dean P. Jarski, Rochester Hills, MI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/185,533

(22) Filed: Mar. 17, 2023

(65) Prior Publication Data
US 2023/0221398 A1  Jul. 13, 2023

Related U.S. Application Data

(63) Continuation of application No. 17/587,344, filed on Jan. 28, 2022, now Pat. No. 11,635,482, which is a continuation-in-part of application No. 16/896,323, filed on Jun. 9, 2020, now Pat. No. 11,558,132.

(51) Int. Cl.
| | |
|---|---|
| G01S 5/02 | (2010.01) |
| G01S 5/00 | (2006.01) |
| H04B 17/336 | (2015.01) |
| H04W 24/10 | (2009.01) |
| H04W 64/00 | (2009.01) |
| H04W 72/541 | (2023.01) |

(52) U.S. Cl.
CPC .......... *G01S 5/0215* (2013.01); *G01S 5/0081* (2013.01); *H04B 17/336* (2015.01); *H04W 24/10* (2013.01); *H04W 64/003* (2013.01); *H04W 72/541* (2023.01)

(58) Field of Classification Search
CPC .. H04B 17/336; H04W 72/541; H04W 24/10; H04W 64/003; G01S 5/0081
See application file for complete search history.

(56) References Cited

U.S. PATENT DOCUMENTS

2020/0127901 A1    4/2020 Hariharan et al.

*Primary Examiner* — Natasha W Cosme

(57) ABSTRACT

An interference detection system in a network determines that an unknown radio frequency (RF) interference source that causes RF interference experienced by a first wireless station is a persistent RF interference source over a plurality of time intervals in a selected time period. A predicted interference source location is identified for each time interval in the selected time period. An aggregated predicted interference source location is calculated based on the identified one or more predicted interference source locations.

20 Claims, 12 Drawing Sheets

SYSTEMS AND METHODS FOR IDENTIFYING A SOURCE OF RADIO FREQUENCY INTERFERENCE IN A WIRELESS NETWORK

CROSS-REFERENCE TO RELATED APPLICATIONS

The present application claims priority to and is a continuation of U.S. patent application Ser. No. 17/587,344, filed Jan. 28, 2022 and entitled "Systems and Methods for Identifying a Source of Radio Frequency Interference in a Wireless Network," which is a continuation-in-part of U.S. patent application Ser. No. 16/896,323, filed Jun. 9, 2020, and entitled "Systems and Methods for Identifying a Source of Radio Frequency Interference in a Wireless Network," the entirety of which are hereby incorporated by reference herein.

BACKGROUND

Wireless telecommunications networks may operate on portions of the radio frequency (RF) spectrum. In some situations, interference may be caused in such a way that is detrimental to the performance of a given wireless telecommunications network. For example, external interference may occur when a device external to the network site transmits a signal in a spectrum that overlaps the RF spectrum of the network. In some instances, interference events are irregular, affecting sites on a particular day of the week or specific business hours, which can make it difficult to identify the cause or source of the interference. Furthermore, the conventional process for identifying a source of interference requires significant human capital and specialized equipment. For example, even after field engineers manage to determine that an interference event is occurring or has occurred for a particular network site, the engineers must physically canvass the area proximate to the network site with a directional antenna to identify fluctuations of the interference levels until the source of the interference is identified.

DETAILED DESCRIPTION OF THE PREFERRED EMBODIMENTS

The following detailed description refers to the accompanying drawings. The same reference numbers in different drawings may identify the same or similar elements. The following detailed description does not limit the invention, which is defined by the claims.

Telecommunications service providers may operate wireless networks (e.g., cellular or other types of wireless networks) at a given set of frequencies (or frequency bands) of the Radio Frequency (RF) spectrum. While these frequencies are often licensed (e.g., by a governmental agency and/or by some other authority) for exclusive use by one entity or operator, some bands may be shared by multiple different entities. For instance, a portion of the RF spectrum may be designated for "shared access," or a portion of the RF spectrum that was previously licensed for access by one entity may be licensed for additional entities. In situations where the same portion of the RF spectrum is licensed for use by multiple entities, the use of the portion of the RF spectrum by one entity may negatively impact the use of that portion of the RF spectrum by other entities.

Figure 1:
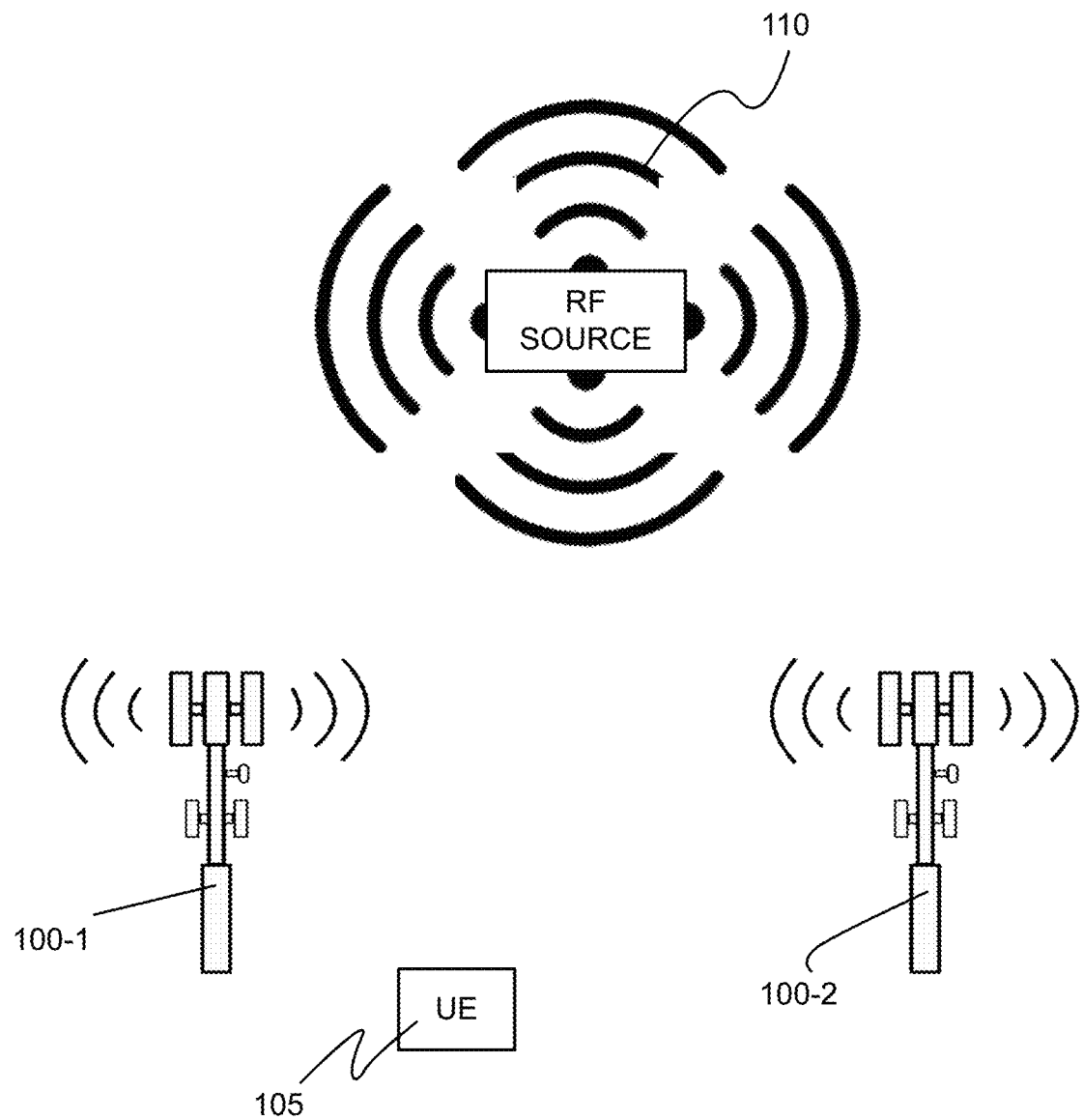
FIG. 1 illustrates an overview of an environment in which systems and methods consistent with embodiments are used.

For example, and as shown in FIG. 1, an entity may cause excessive RF interference (referred to herein simply as "interference" or "noise"). In some cases, there may be multiple sources causing RF interference. For example, assume that a wireless network provider operates wireless stations 100-1 to 100-2 within a particular frequency band, and that wireless stations 100 services a user equipment device (UE) 105. Further assume that another device 110 (also referred to as broadcast source 110), which is associated with another entity, also operates within the same frequency band, and emits an RF interference signal into that band because of intermodulation, excessive power, poor filter design, or for other reasons. Such third-party broadcast sources may negatively impact the operation of wireless station 100 (and/or of UE device 105 that communicate with wireless station 100, such as mobile telephones, Internet of Things ("IoT") devices, Machine-to-Machine ("M2M") devices, etc.), by introducing RF interference or noise. Because the broadcast source is associated with an entity that is separate from the entity that owns and operates wireless stations 100, it may be difficult to coordinate the operation of wireless station 100 to account for the unexpected and unpredictable interference caused by the broadcast source.

Consistent with implementations described herein, an interference source location determination tool may be provided to more quickly and accurately identify a likely location of an interference source. In particular, interference may be determined based on a particular frequency range within which it is occurring. Wireless stations 100 are configured to operate in accordance with various frequency bands and time slots, arranged in physical resource blocks (PRBs). A PRB denotes the most granular aspect of a wireless station's capabilities and includes both a frequency component and a time component. As described herein, interference may be experienced and analyzed on a per-PRB basis.

For example, as described herein, interference-indicating data, such as uplink power measurements data (i.e., uplink interference level measurements) for particular PRBs may be received and stored by the wireless stations 100. When a wireless station experiences external interference, interference-indicating data for the neighboring wireless stations are retrieved and analyzed to determine whether similar interference is perceived by any neighboring wireless stations. Once wireless stations that are not experiencing a similar external interference are filtered out, a heat map indicating a likely location(s) of the interference source may be generated.

For example, when an affected wireless station is 100 is identified (referred to herein as main wireless station 100-1), either autonomously by an interference detection system or via external (e.g., manual) reporting, other wireless stations 100 that are proximate (i.e., geographic neighbors) to the main wireless station 100-1 are examined for similar interference experiences on a particular PRB or PRBs affecting main wireless site 100-1.

Consistent with embodiments described herein, the likely location(s) may be determined by calculating error, such as root mean square error (RMSE) by using Free Space Path Loss (FSPL) calculations based on a number of interference source location guesses. The process is iteratively repeated until minimum values of FSPL are determined. The heat map is generated based on the calculations for each of a number of guessed locations. In one implementation, the generated heat map is provided to field engineers to assist in expediting manual identification of the interference source. In other implementations, the generated heat map may be forwarded to an autonomous identification system (e.g., an artificial intelligence-based system) to investigate and identify the interference source. For example, the autonomous identification system may deploy one or more autonomous vehicles (e.g., automobiles, unmanned aerial vehicles, etc.) based on the generated heat map.

Figure 2:
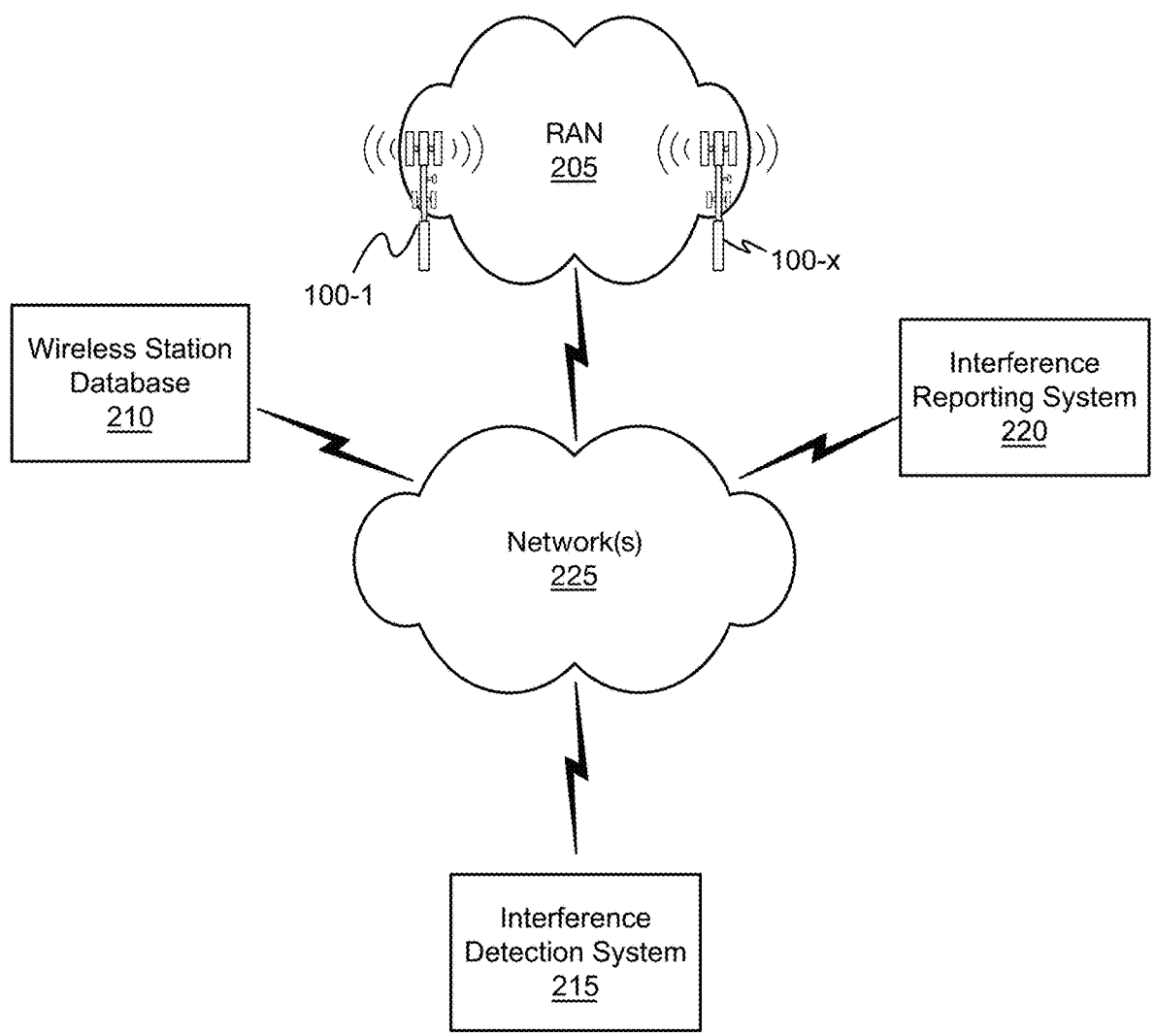
FIG. 2 illustrates an example environment in which one or more embodiments, described herein, may be implemented.

FIG. 2 illustrates an example environment in which one or more embodiments, described herein may be implemented. As shown in FIG. 2, environment 200 may include radio access network (RAN) 205 that includes a plurality of wireless stations 100-1 to 100-*x* (collectively referred to as wireless stations 100 and individually referred to as wireless station 100), a wireless station database 210, an interference detection system 215, an interference reporting system 220, and one or more networks 225. The number of devices and/or networks, illustrated in FIG. 2, is provided for explanatory purposes. In practice, environment 200 may include additional, fewer, different, or a different arrangement of devices and/or networks than illustrated in FIG. 2.

For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections. In some implementations, devices of environment 200 may be physically integrated in, and/or may be physically attached to other devices of environment 200.

RAN 205 may include a wireless telecommunications network (e.g., a Long-Term Evolution (LTE) RAN, a Third Generation Partnership Project (3GPP) a Fifth Generation (5G) RAN, etc. As mentioned above, RAN 205 may include one or more wireless stations 100, via which devices (e.g., user equipment (UE), such as mobile telephones, IoT devices, M2M devices, etc.) may communicate with one or more other elements of environment 200. RAN 205 may communicate with such devices via an air interface. For instance, RAN 205 may receive traffic (e.g., voice call traffic, data traffic, messaging traffic, signaling traffic, etc.) from a UE via the air interface, and may forward the traffic to network 225. Similarly, RAN 205 may receive traffic intended for a UE from network 225 and may forward the traffic to the UE via the air interface. RAN 205 may operate at a set of frequencies (e.g., a set of licensed spectra). In some embodiments, one or more of the bands, at which RAN 205 operates, may be shared with an entity other than the entity that owns and/or operates RAN 205.

Wireless station database 210 may include one or more devices (e.g., a server device, or a collection of server devices) for storing wireless station-related information. For example, wireless station database 210 may receive, store, and/or output information relating to various wireless stations 100 in RAN 205. Such information may include, among other data elements, identification information, geographic location information, and performance information relating to performance characteristics of each wireless station 100.

Interference detection system 215 may include one or more devices (e.g., a server device, or a collection of server devices) to determine likely locations of interference sources. For example, interference detection system 215 may identify likely locations of interference sources detected in RAN 205. For example, as briefly described above, interference detection system 215 may generate geographic heat maps that identify the likely locations of sources of interference based on data collected from wireless stations 100 within RAN 205. Consistent with embodiments described herein, the heat map may be generated based on statistical minimization of free space path loss calculations at various geographic locations proximate to affected wireless stations. Interference detection system 215 may further take administrative or corrective actions when detecting unique sources of interference, as described in greater detail below.

Interference reporting system 220 may include one or more devices (e.g., a server device, or a collection of server devices) to perform one or more functions described herein. For example, interference reporting system 220 may include messaging systems capable of generating and/or sending messages via network 225. The messages may be emails, text messages, application-specific messages, and/or other types of messages related to alerts that a heat map of possible interference sources has been generated by interference detection system 215. Consistent with implementations described herein, interference reporting system 220 may forward or otherwise notify network personnel (e.g., field engineers) about the identified interference and the generated heat map for use in ascertaining the source of the interference. Interference reporting system 220 may also maintain a history of interference determinations for use in determining patterns.

Network(s) 225 may include one or more wired and/or wireless networks. For example, network(s) 225 may include one or more core networks of a licensed wireless telecommunications system (e.g., an LTE core network, a 5G core network, etc.), an Internet Protocol ("IP")-based PDN, a wide area network ("WAN") such as the Internet, a private enterprise network, and/or one or more other networks. One or more of the devices or networks shown in FIG. 2 may communicate, through network(s) 225, with each other and/or with other devices that are not shown in FIG. 2. Network 225 may further include, or be connected to, one or more other networks, such as a public switched telephone network ("PSTN"), a public land mobile network ("PLMN"), and/or another network.

Figure 3:
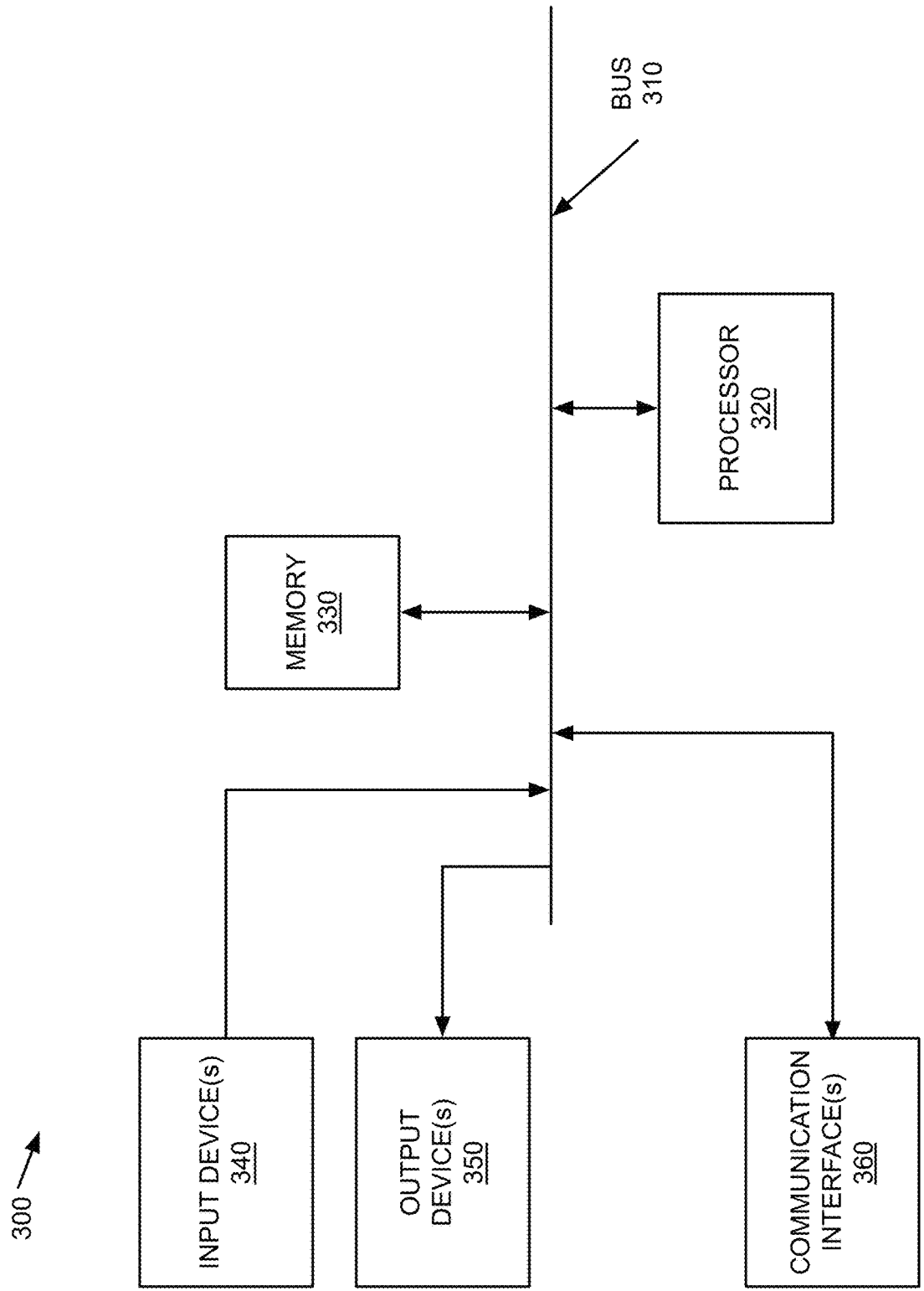
FIG. 3 is a block diagram illustrating example components of a computer device 400 according to one embodiment.

FIG. 3 is a block diagram illustrating example components of a computer device 300 according to one embodiment. Wireless stations 100, wireless station database 210, interference detecting system 215, and interference reporting system 220 may include or may be included within one or more of computer device 300. As shown in FIG. 3, computer device 300 may include a bus 310, a processor 320, a memory 330, an input device 340, an output device 350, and a communication interface 360.

Bus 310 includes a path that permits communication among the components of computer device 300. Processor 320 may include any type of single-core processor, multi-core processor, microprocessor, latch-based processor, and/or processing logic (or families of processors, microprocessors, and/or processing logics) that executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, output device 350 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to one or more antennas/antenna arrays for transmitting and receiving RF signals.

Communication interface 360 may include a logical component that includes input and/or output ports and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth wireless interface, a radio-frequency identification (RFID) interface, a near-field communications (NFC) wireless interface, and/or any other type of interface that converts data from one form to another form.

Device 300 may perform various operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Further, in some embodiments, one or more of the components described above may be implemented as virtual components, such as virtual processors, virtual memory, virtual interfaces, etc. Additionally, or alternatively, one or more components of device 300 may perform one or more tasks described as being performed by one or more other components of device 300.

Figure 4:
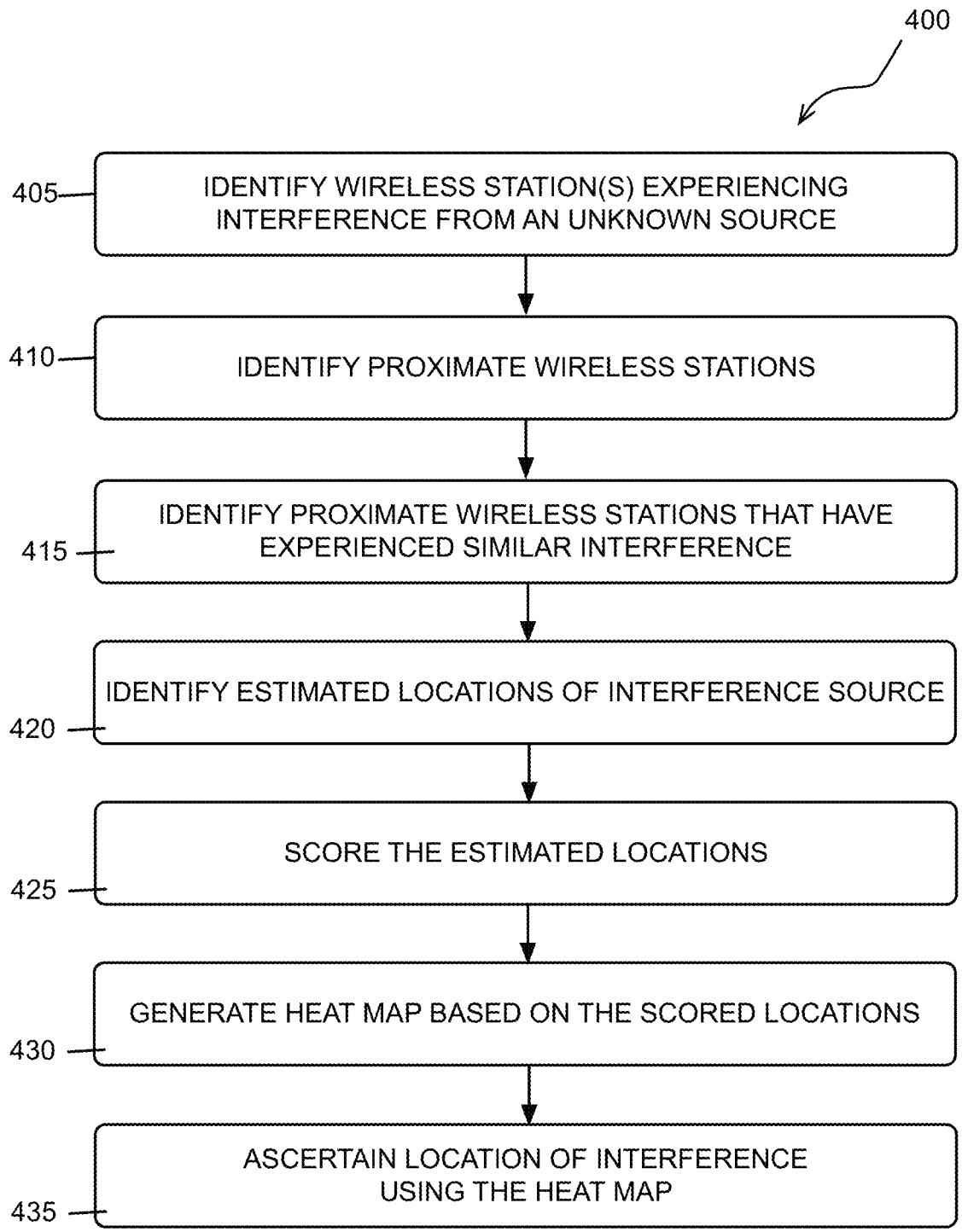
FIG. 4 is a flow diagram illustrating an example process for estimating a location of an unknown interference source, consistent with implementations described herein.

FIG. 4 illustrates an example process 400 for estimating a location of an unknown interference source, consistent with implementations described herein. In some embodiments, process 400 may be performed by interference detection system 215. In some embodiments, process 400 may be performed by, or in conjunction with, one or more other devices or systems, such as wireless station database 210, and/or interference reporting system 220. FIG. 4 is described in conjunction with FIGS. 5-10. Some of these figures include graphs or other graphical representations of data, which may be generated by interference detection system 215. In some embodiments, the figures graphically illustrate calculations, aggregation, analysis, and/or other types of operations that may be performed by interference detection system 215.

Process 400 may include identifying one or more wireless stations that are experiencing unexpected interference, particularly when compared to surrounding wireless stations (block 405). Consistent with embodiments described herein, interference may be determined based on a particular frequency range within which it is occurring. Wireless stations 100 are configured to operate in accordance with various frequency bands and time slots, arranged in physical resource blocks (PRBs). A PRB denotes the most granular aspect of a wireless station's capabilities and includes both a frequency component and a time component. For long term evolution (LTE) wireless stations (e.g., eNodeB's) or 5G New Radio (5G) wireless stations (e.g., gNodeB's), each wireless station 100 may have a set number of PRBs across its available frequency spectrum, each of which comprise approximately 180 KHz of bandwidth. Accordingly, for a wireless station 100 operating in a 10 MHz band, the wireless station will generally include 50 PRBs, each having a discrete frequency and time allocation. Thus, for a given sector (e.g., where "sector" refers to a particular geographic region, which may approximately or precisely correspond to the coverage area of a particular wireless station 100, or a set of wireless stations 100, of RAN 205) and over a given time window (e.g., one minute, one hour, one day, one week, etc.), the received (i.e., uplink) radio power, per PRB, may be measured or otherwise retrieved.

Figure 5:
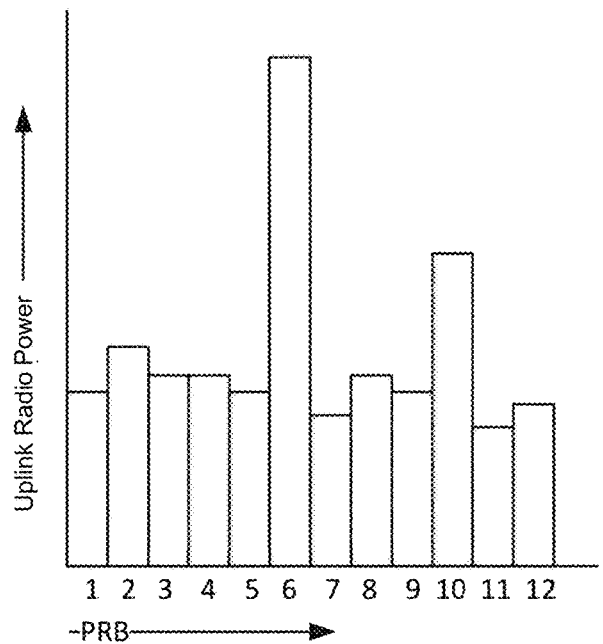
FIG. 5 is a graph of exemplary uplink radio power for a wireless station on a per-physical resource block (PRB) basis.

For instance, FIG. 5 includes a graph that shows an example of uplink radio power, on a per-PRB basis, at a given sector and within a given time window. Each bar on the plot may indicate, in some embodiments, an average of the received uplink radio power measured over a time window. In some embodiments, the plot may indicate different aspects of the received radio power (e.g., the maximum uplink radio power measured over the time window, the minimum uplink radio power measured over the time window, etc.). As shown, the uplink radio power measured at PRB 6 and PRB 10, at the sector and over the time window, may be relatively high, as compared to the radio power at the other PRB s. The relatively high uplink radio power may indicate a likely interference event.

Consistent with implementations described herein, PRB uplink interference level measurements or other related measurements for wireless stations 100 may be aggregated or otherwise maintained in wireless station database 210 on a periodic basis, such as every minute, every 10 minutes, every hour, etc. For example, wireless stations 100 may be configured to report various elements of performance metrics (i.e., key performance indicators (KPIs)) on a periodic basis. The reported KPIs may include uplink power level measurements for each PRB in the wireless station 100. Interference detection system 215 may monitor the PRB uplink power measurements for each wireless station 100 and may determine instances of likely interference based thereon. For example, continued disrupted PRB uplink power measurements over a period of time (e.g., three days, etc.) may be a strong indication of a consistent external interference source. In one example, this may be identified by uplink interference levels of greater than −110 dBm on mildly affected wireless stations and uplink interference levels of approximately −80 dBm for more heavily affected sites. By comparing uplink interference level measurements over a period of time on each PRB, the existence of interference effects on each wireless station may be determined, In some embodiments, autonomous systems, such as artificial intelligence or machine learning systems may be implemented in interference detection system 215 to identify interference-experiencing wireless stations 100 based on the available historical data. In other implementations, interference detection system 215 may receive indications of interference experiencing wireless stations 100 via a manual reporting system. For example, wireless interference detection system may receive a wireless station identifier and date/time of the interference from an operator.

When an affected wireless station 100 is identified (e.g., wireless station 100-1), either autonomously by interference detection system 215 or via external (e.g., manual) reporting, wireless stations 100 that are proximate (i.e., neighbors) to the identified wireless station 100-1 (also referred to as the "main wireless station" 100-1) are examined for similar interference experiences (block 410). For example, interference detection system 215 may identify neighboring wireless stations 100 within an initial distance from the main wireless site 100-1, based on the geographic location of the main wireless site 100-1, the PRB(s) that are experiencing the interference, and the timeframe(s) during which the PRB(s) experienced the interference. As described above, wireless station database 210 may include information regarding wireless stations in RAN 205, such as location information (e.g., longitude and latitude information) and performance metrics (e.g., PRB KPIs). Using the collected information regarding wireless stations 100 in RAN 205, interference detection system 215 may ascertain the identities and locations of neighboring wireless stations 100 that are experiencing similar interference during similar timeframes. For example, identifying similar interference effects on neighboring wireless stations 100 may include identifying this wireless stations 100 having similar uplink interference level measurements on the same PRBs during the same time interval as main wireless station 100-1.

Figure 6:
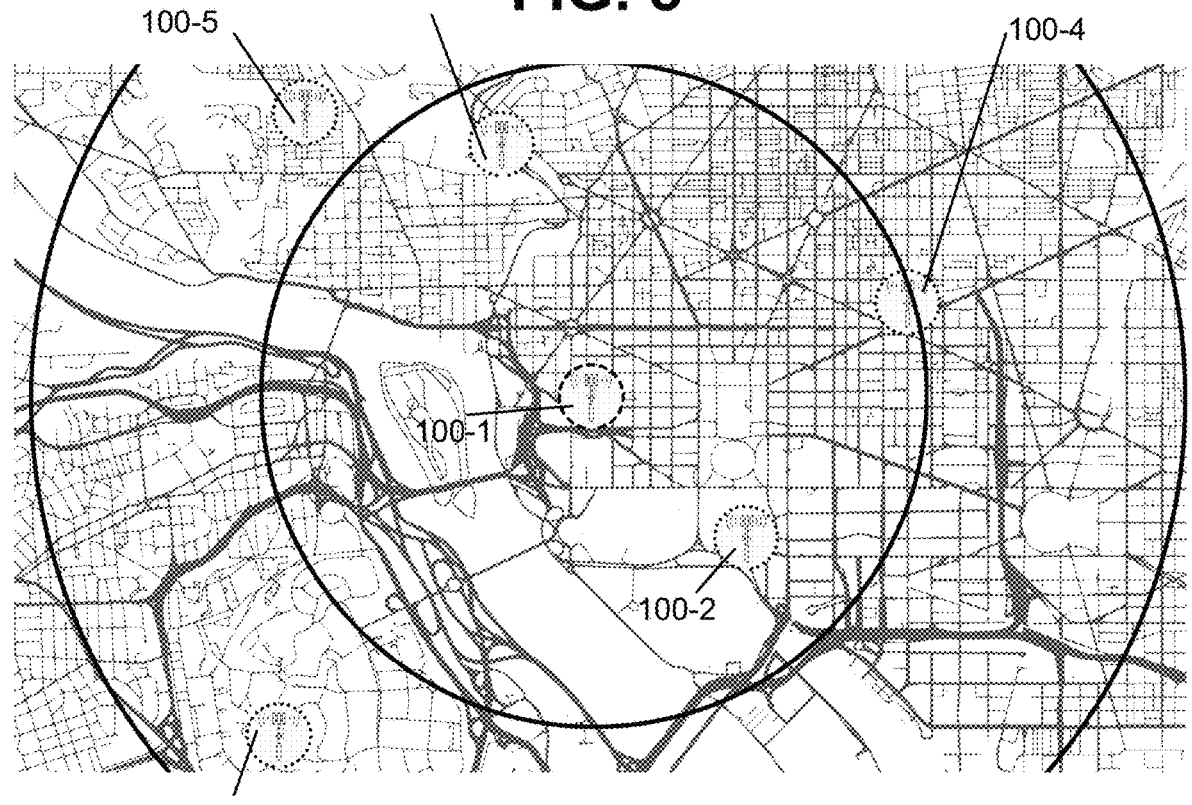
FIG. 6 illustrates an exemplary main wireless station and a number of neighboring wireless stations.

FIG. 6 illustrates the main wireless station 100-1 and a number of neighboring wireless stations 100-2, 100-3, 100-4, 100-5, and 100-6. Assume that main wireless station 100-1 has experienced interference from an unknown source during at least some point in time. Consistent with embodiments described herein, performance data for neighboring wireless stations 100-2 to 100-6 that exhibit a similar interference, may be obtained.

In some implementations, wireless stations 100-2 to 100-6, which may experience interference may be determined in an expanding step-wise manner based on a location from main wireless station 100-1. For example, interference on neighboring wireless stations 100 may be initially determined for neighboring wireless stations that are within distances of about 3-4 kilometers (km) from the initial or main wireless station 100-1. For example, as shown in FIG. 6, wireless stations 100-2, 100-4, and 100-5 are within the initial range. If none of the stations are in the initial range, the range may be expanded incrementally, until a maximum range is reached. For example, the range may be expanded in 2 km increments until at least one other neighbor is determined or a maximum of 10 km from the main wireless station 100-1 is reached, though other smaller or larger increments are contemplated herein. Neighbors at the shortest distance are more likely to experience the same interference as the main site and also offer data for enabling better accuracy when generating a heat map.

Referring back to FIG. 4, after identifying neighboring wireless stations 100, wireless stations 100 that are experiencing similar interference effects are determined (block 415). As described above, external interference typically affects a small number of PRBs at a wireless station 100. To filter out wireless stations that are not experiencing the same interference, the PRB interference-related KPI data (e.g., uplink signal level values) for the candidate wireless stations 100 for the same time period as the main wireless station has detected interference, are retrieved and compared to the corresponding interference-related KPI data on the affected PRBs. For example, using uplink interference levels as an interference-related KPI, values in a −115 dBm to −120 dBm range generally indicate a low interference signal. In contrast, a high interference signal is usually indicated by an uplink interference level ranging from approximately −75 dBm to −105 dBm. It should be noted that these ranges may be different, depending on the environment and traffic each wireless station is handling.

By way of example, assume main wireless station 100-1 has identified an uplink interference level of −90 dBm on PRB 30 and an uplink interference level of −85 dBm on PRB 20, as indications of possible interference at PRBs 20 and 30. When identifying relevant neighbors, wireless stations having normal (e.g., −115 dBm to −120 dBm) uplink signals for PRBs 20 or 30 are excluded or filtered out, even if those wireless stations exhibit higher signals level on different PRBs. To focus the analysis on particular interference signals, data that may indicate other possible interference signals or factors are excluded. For the following discussion, assume that wireless stations 100-2, 100-4, and 100-6 are identified as experiencing interference on the same PRBs during the same timeframe as main wireless station 100-1.

After identifying neighboring wireless stations 100 as sites that may have experienced similar interference as main wireless station 100-1, an analysis of the PRB data for those wireless stations is performed to identify estimated locations for the source of the interference (block 420). For example, to determine candidate interference source locations, path loss calculations, such as free space path loss (FSPL) calculations may be performed for each of a plurality of location approximations based on the distance between the wireless station and the selected location approximation, the RF frequency of the PRB under investigation, and the estimated or expected uplink interference levels at the wireless station. Minimization calculations may be performed to increase the accuracy of the obtained coordinates. For example, an indication of the accuracy of the selected location approximation may be calculated for each of the wireless stations experiencing interference based on the FSPL calculations and the actual observed uplink interference level, and the interference source location approximation may be iteratively adjusted until further adjustment does not result in an increased level of accuracy. Although FSPL is provided as an exemplary path loss calculation methodology, it should be understood that additional methods of path loss determination may also be used, consistent with implementations described herein. Additional details regarding an exemplary process for determining candidate interference source locations is provided below with respect to FIG. 7.

Once candidate estimated interference source locations have been identified, scores are generated for each of the identified locations (block 425). For example, interference detection system 215 determines a score for use in generating a heat map of possible interference source locations briefly described above. In one exemplary implementation, the scores may be based on the RMSE values as well as a statistical constant reflecting the number or count of wireless stations that are possibly experiencing the interference. For example, each score may be weighted 70% based on the number of wireless stations being analyzed and 30% based on the RMSE for the particular location.

Next, a heat map is generated based on the identified locations and their relative scores (block 430). For example, interference detection system 215 generates a map that indicates the identified locations and provides graphical indications of the probabilities that the interference source is proximate to the identified locations.

The generated heat map may be used to ascertain the actual location of the interference source and to initiate remediation (block 435). For example, interference detection system 215 may provide or forward the heat map to interference reporting system 220 for delivery to relevant field personnel or other entities associated with the service provider of RAN 205. In addition, as generally described above, an autonomous identification system may use the generated heat map may to investigate and identify the interference source, without manual, human intervention. For example, the autonomous identification system may deploy one or more autonomous vehicles based on the generated heat map. In some embodiments, the deployed vehicles may include an RF spectrum analyzer or similar measurement tools for locating and identifying the source of RF interference. Once an interference source location is confirmed, (e.g., when the automated vehicle identifies spikes in the interference levels in the specific area it is driving/flying in) field personnel may be dispatched to communicate with the property owner to resolve the interference, if possible. In other implementations, automated messages or letters may be provided to relevant property owners, regarding eliminating/minimizing the interference.

Figure 7:
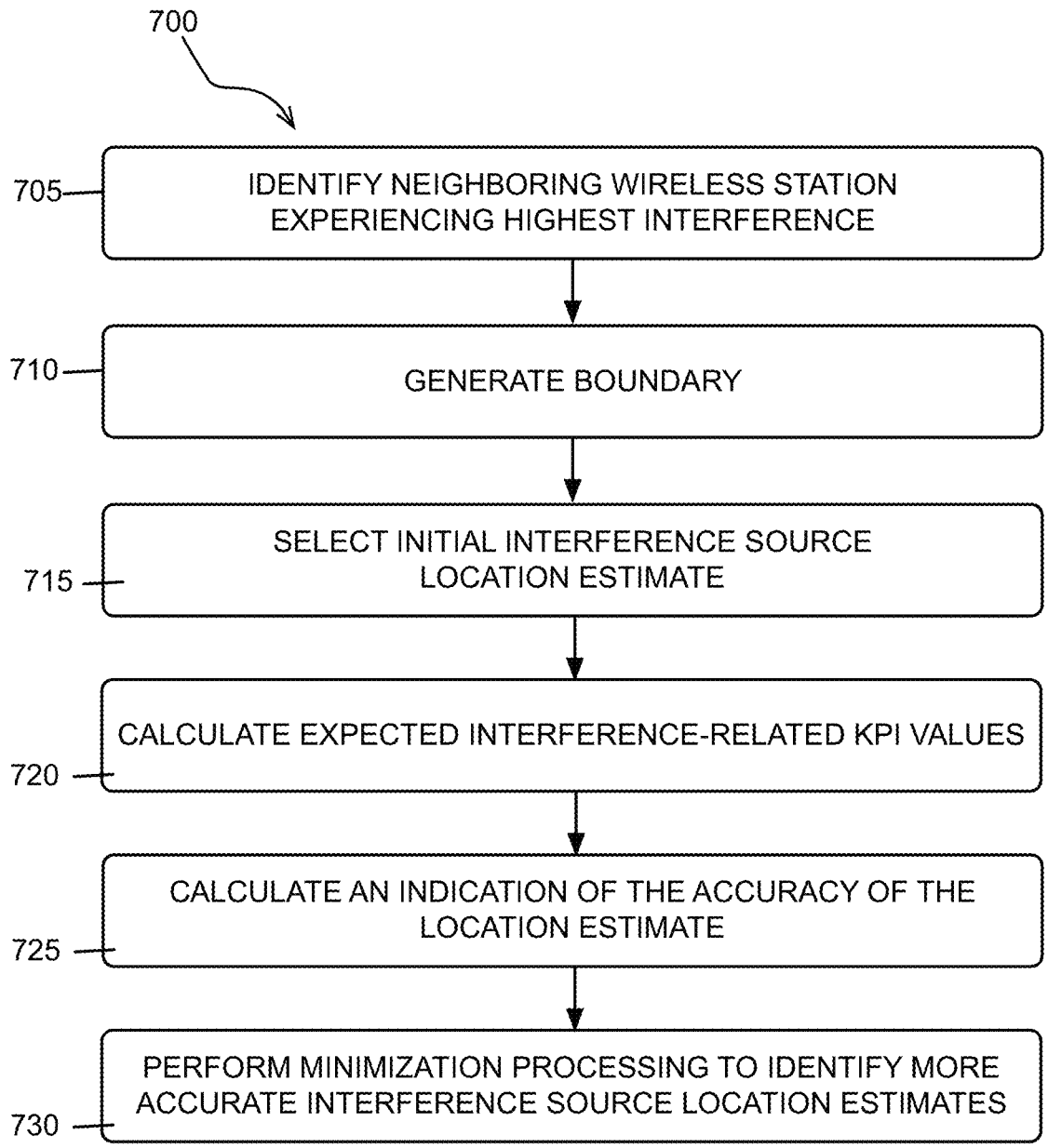
FIG. 7 is a flow diagram illustrating one implementation of a process for identifying candidate interference source locations consistent with embodiments described herein.

FIG. 7 is a flow diagram illustrating one implementation of a process 700 for determining candidate interference source locations consistent with embodiments described herein. Process 700 may be performed by interference detection system 215. However, in some embodiments, process 700 may be performed by, or in conjunction with, one or more other devices or systems, such as wireless station database 210, and/or interference reporting system 220.

Process 700 may include identifying the neighboring wireless station 100 whose PRB data shows the highest interference (block 705). For clarity, the identified wireless station 100 may be referred to as the "strongest correlating station." For example, using the information retrieved from wireless station database 205, interference detection system 215 may compare the uplink interference levels for the particular timeframe under investigation for each of the wireless stations identified in block 410. For example, as briefly described above, identifying similar interference effects on neighboring wireless stations 100 may include identifying this wireless stations 100 having similar uplink interference level measurements on the same PRBs during the same time interval as main wireless station 100-1. The strongest correlating station may be identified as the neighboring wireless station whose uplink interference levels most closely align with those of the main wireless station.

As the result of the comparison, interference detection system 215 may conclude that wireless station 100-1 is the strongest correlating station. The strongest correlating station may not be the main wireless station, since various factors may go into an initial identification of an interference condition, for example the identification may be made manually in response to customer complaints, effects on other network equipment, diagnostics, etc.

Figure 8:
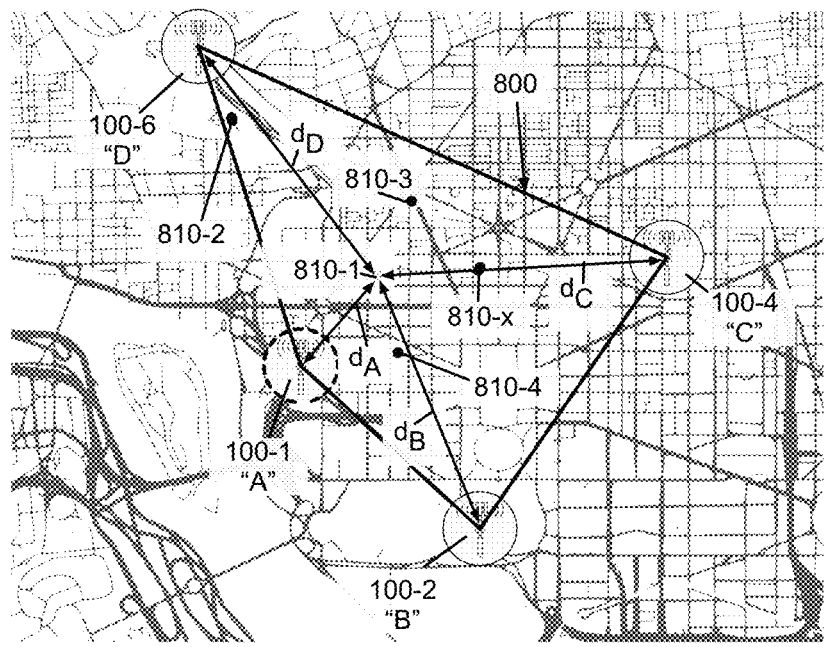
FIG. 8 is a graphical depiction of an exemplary boundary selection for the example of FIG. 6.

Next, the geographic boundary for the likely interference sources is determined based on all possible combinations of the strongest correlating station with all other interference-affected neighbors (block 710), where each combination may correspond to a portion of the boundary. For example, if block 410 above identified three interference-affected wireless stations (100-1 (referred to as A), 100-2 (referred to as B), 100-4 (referred to as C), and 100-6 (referred to as D)), with the strongest correlating station being wireless station A, the remaining combinations would include wireless station A-B, A-C, A-D, A-B-C, A-B-D, A-C-D, and A-B-C-D. FIG. 8 graphically depicts an example of such a boundary selection over the map of FIG. 6. As shown, wireless stations 100-1, 100-2, 100-4, and 100-6 form the vertices along the outer boundary 800 within which the interference source is likely to be found.

Next, an initial interference source location within the geographic boundary is selected (block 715). An exemplary location is depicted in FIG. 8 at location 810-1, within boundary 800. In some implementations, an initial location may be set equal to the location of the strongest correlating station, although any other location with boundary 600 may be selected.

Using the selected location, expected interference-related KPI values for each wireless station on each combination from the initially selected location are determined (block 720). For example, expected uplink interference signal level values may be calculated using free space path loss as expressed by equations (1) and (2) below:

$$d = 10^{(20\,log_{10}(frequency)-Signal\,Level-27.55)/20}, \quad (1)$$

where d is the distance between wireless station and the selected location (in km), frequency refers to the RF frequency (in megahertz) of the PRB under investigation, SignalLevel refers to the estimated or expected uplink interference signal level value at the wireless station (in decibel-milliwatts), and 27.55 is a constant relating to the spherical wave front of the RF signal and the units selected for the computation (e.g., km and MHz) in this example. The distances between the selected location and the respective wireless stations A-D are depicted as $d_A$ to $d_D$ in FIG. 8. Solving equation (1) for SignalLevel results in:

$$SignalLevel = 20\,log_{10}(frequency) + 20\,log_{10}(d) - 27.55 \quad (2)$$

Once expected values for uplink interference levels have been calculated for each wireless station 100, these values are compared to the observed or actual values to determine the accuracy of the selected location (block 725). In one implementation, the comparison may include calculating root mean squared error for each interference experiencing wireless station. The root mean squared error may be expressed as:

$$RMSE = \sqrt{[\Sigma_{i=1}^{n}(Expected_i - Actual_i)^2/n]}, \quad (3)$$

where n is the number of interference-experiencing wireless stations, expected is the uplink interference level calculated in equation (2), and actual is the observed uplink interference level at the time of the interference, whose value was retrieved from wireless station database 210 at block 410 above. A lower value for RMSE indicates that the expected value is closer to the actual value over the range of data. Although RMSE is described as an accuracy determining methodology herein, other statistical calculations for error may be used, such as mean square error (MSE), mean absolute scaled error (MASE), mean absolute percentage error (MAPE), symmetric MAPE (SMAPE), etc.

A minimization process is performed for RMSE (block 730). For example, interference detection system 215 may iteratively select additional estimated locations and calculate expected and RMSE values for each location, until a minimum RMSE is obtained. Process 700 may result in determining a number of locations and their corresponding RMSE values.

Figure 9:
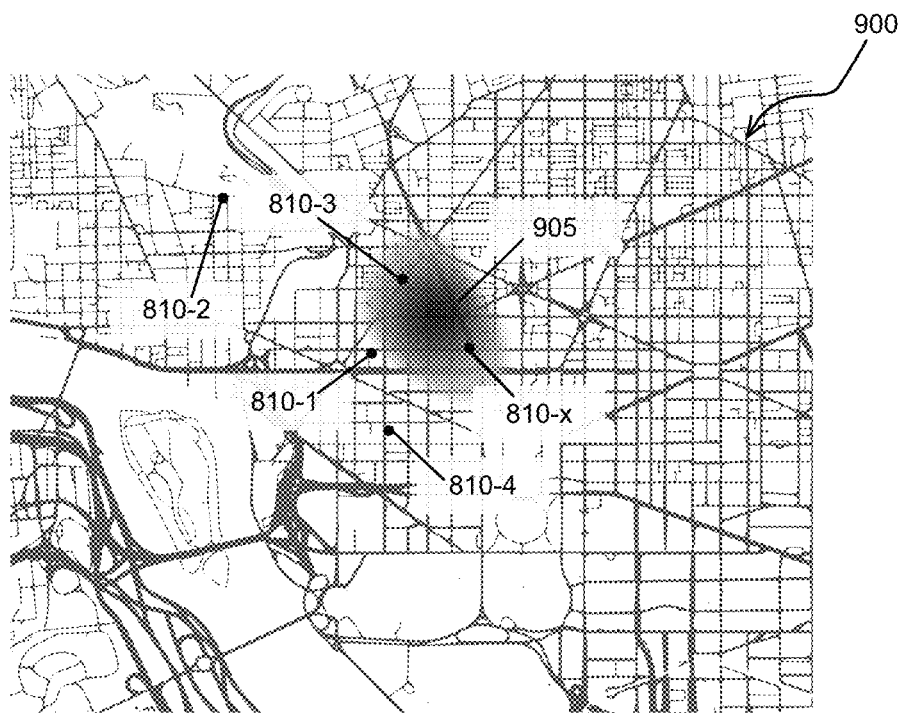
FIG. 9 illustrates an exemplary heat map based on the example of FIG. 6.

FIG. 9 is an example of a heat map 900 generated using the process of block 430. As shown, heat map 900 includes a geographical map of the affected locations and identifies the specific locations 810-1 through 810-x. In addition, heat map 900 includes graphical indicia 905 based on the relative scores and aggregate proximity for each location that indicates a relative probability that the interference source would be found in a particular area. In some embodiments, as shown in FIG. 9, graphical indicia 905 may be provided as an overlay of varying color or opacity to indicate higher and lower probability.

In the embodiments described above, sector azimuth (i.e., angle of orientation of the antenna) and beam width are not taken into consideration in identifying a possible interference source. This may be the case for wireless stations that broadcast omnidirectional signals having a beam width of 360 degrees. However, in some circumstances, particular sectors of wireless stations may transmit signals in different, selected directions. To account for the antenna directions, the FSPL determined at block 420 may be adjusted by identifying boundaries (e.g., polygons) for each one of the sectors for each wireless station. The FSPL calculation may then be adjusted based on whether a guessed location falls within the boundary for the particular sector. If the guessed location is within the boundary, no adjustments are necessary. However, if the point is not within the boundary, an adjustment is made to the FSPL calculation for the particular location. For example, a +3 dB adjustment may be made to reflect that the particular wireless station is not detecting the interference directly within its transmission beam and detects a lower level of interference than the one calculated without the adjustment.

Figure 10:
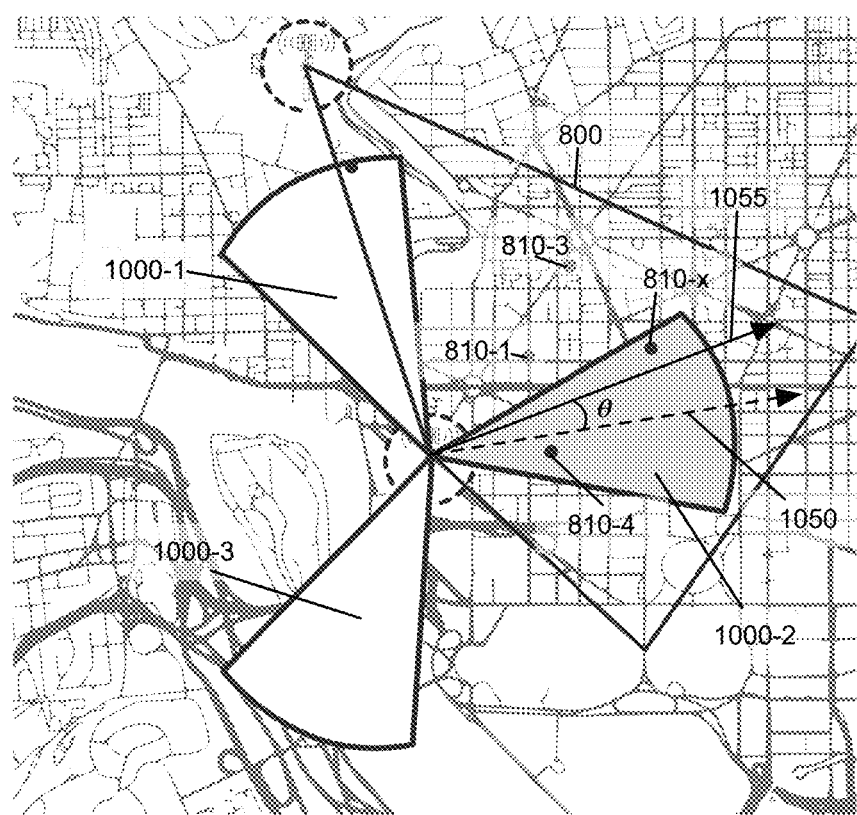
FIG. 10 is a view of a portion, of the map of FIG. 8, illustrating sector boundaries for a wireless station.

FIG. 10 illustrates a portion of FIG. 8 in which wireless station 100-1 cover sectors 1000-1 to 1000-3. Sector 1000-2 is under investigation for the PRBs discussed above and is shaded in gray. In this example, several of locations 810 are not within the boundaries of sector 1000-2. Consistent with embodiments described herein, the FSPL calculations for these guessed locations may be adjusted by +3 dB for each wireless station, for which the location falls outside of the sector boundary. In this way, lower interference values for locations outside of a particular sector do not unnecessarily impact the RMSE minimization process. The adjustments may result in more accurate location determination.

In some instances, various portions of the heat map may have similar intensities (based on the scores generated in block 425 above), rendering it difficult to identify a particular field search starting point without field expertise or any additional information. Consistent with embodiments described herein, a collocated sector analysis may be performed to estimate a direction in which the interference source is more likely to be located on a per-wireless station basis.

Figure 11:
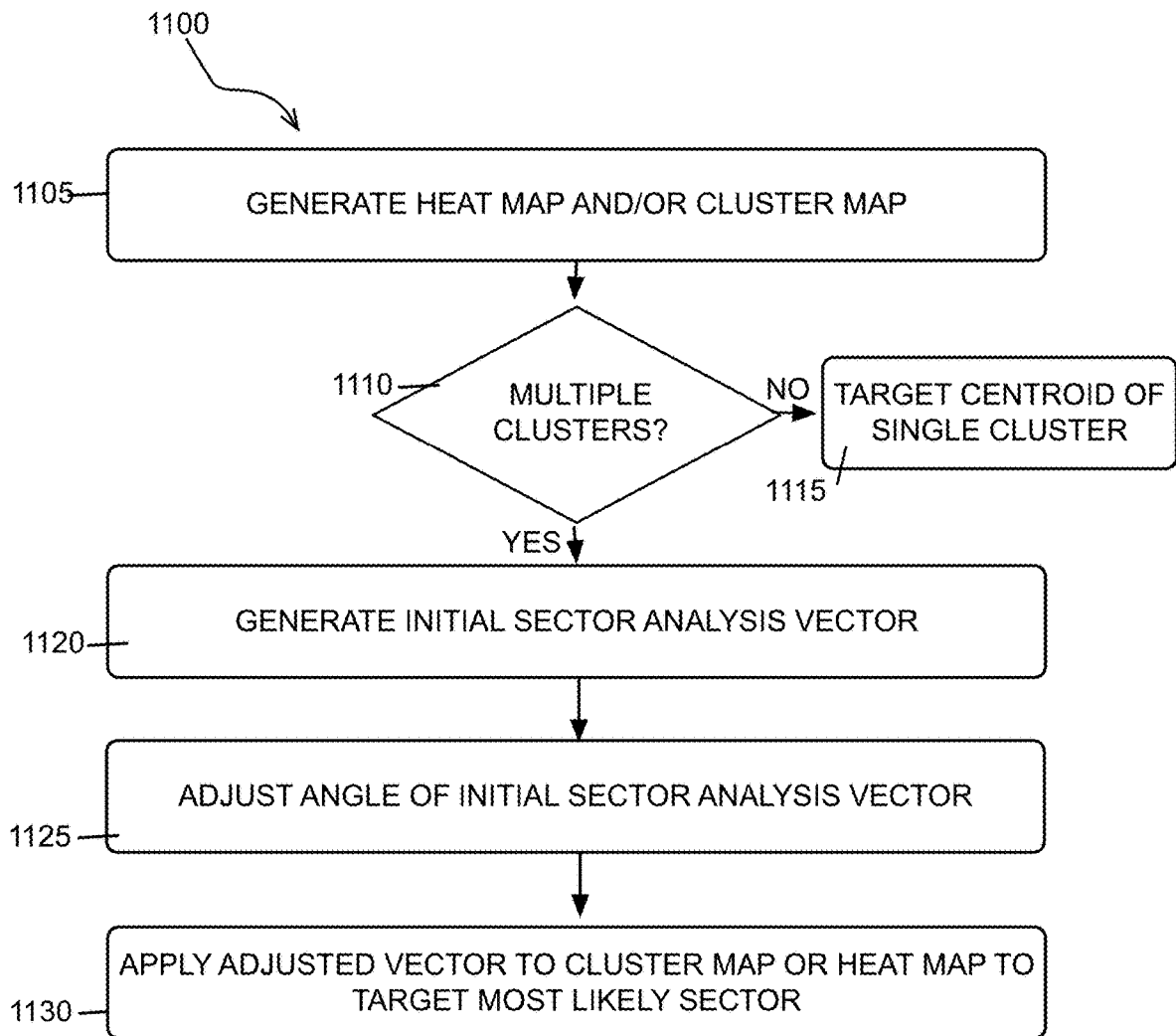
FIG. 11 is a flow diagram illustrating one implementation of a process for sector analysis vector generation consistent with embodiments described herein.

FIG. 11 illustrates an example process 1100 for determining a starting search location based on a collocated sector analysis. In some embodiments, process 1100 may be performed by interference detection system 215. In some embodiments, process 1100 may be performed by, or in conjunction with, one or more other devices or systems, such as wireless station database 210, and/or interference reporting system 220. FIG. 11 is described in conjunction with FIG. 10.

In addition to, or in lieu of the heat map described above (e.g., heat map 900), a cluster map may be generated (block 1105) that clusters the possible interference source locations based on a predetermined cluster distance (e.g., 800 meters). Next, it is determined whether multiple clusters have been identified (block 1110). For example, based on K-means clustering, various clusters and related cluster centroids may be generated. If optimized clustering results in a single cluster being identified (block 1110—NO), field searching may be targeted based on the centroid of the identified cluster (block 1115). However, if multiple clusters are identified (block 1110—YES), an initial sector analysis vector may be generated for each wireless station 100 that is experiencing similar interference effects (block 1120).

As described above in relation to FIG. 10, each wireless station 100 that is experiencing similar interference effects (as identified in block 415 above) may have more than one sector pointing in different directions (azimuth) and with different beam widths. Taking this into account, it can be assumed that, like the embodiment of FIG. 10, any sector that is seeing the interference source directly (i.e., within its azimuth and beam width) will most likely show a higher interference power level. Accordingly, for a site that has more than one sector affected by interference, a vector can be initially determined in the direction of the most affected sector's azimuth (e.g., that sector showing the highest interference power level; also referred to as the "main" sector). In the example, of FIG. 10, this vector 1050 (shown as a dashed line) would be directed along the azimuth angle of sector 1000-2, which may be referred to as the main sector.

Next, consistent with implementations described herein, the angle of the initial sector analysis vectors may be steered (i.e., adjusted) based on the interference power levels on the collocated sectors (block 1125). For example, consider wireless station wireless station 100-1 having sectors 1000-1 to 1000-3, as shown in FIG. 10. As discussed above, each sector 1000-1 to 1000-3 has a particular interference power reading for a particular PRB that is experiencing interference effects. A resultant vector 1055 may be generated based on the azimuth, beam width, and interference power level in the main sector (the one with the highest reading) as well as each of the other sectors. In one implementation, the angle adjustment from the main sector azimuth angle is based on a ratio of the main sector interference power level to each of the remaining sector power levels, which may be referred to as the intensity ratio for each of the remaining sectors.

Using the sector example of FIG. 10, assume that for PRB 40 under analysis, sector 1000-2 is the main sector and has an azimuth of 0° and a beam width of 120° and an interference power level of −83 dBm, sector 1000-3 has an interference power level of −102 dBm, and sector 1000-1 has an interference power level of −90 dBm. Using this information, an intensity ratio of 1.23 is calculated for sector 1000-3 (−102/083) and an intensity ratio of 1.08 is calculated for sector 1000-1 (−90/−83). The angle of adjustment (denoted as θ in FIG. 10) may be calculated using the difference between the intensity ratios for sectors 1000-3 and 1000-1, which is 0.15 in this case (1.23-1.08). This difference in ratios is then multiplied with beam width of main sector 1000-2 (120°), resulting in an angle adjustment of 18° (120×0.15) toward sector 1000-1, as represented by adjusted vector 1050 in FIG. 10. Note that if sector 1000-3 had a higher intensity ratio than sector 1000-1, the difference would be negative 0.15, which would result in a −18° angle adjustment toward sector 1000-3.

Once the sector analysis vectors have been adjusted for all wireless stations experiencing interference effects, the vectors may be applied (e.g., overlaid) on the heat map and/or cluster map to help target a likely interference source from among a number of candidate locations or clusters (block 1130).

Figure 12:
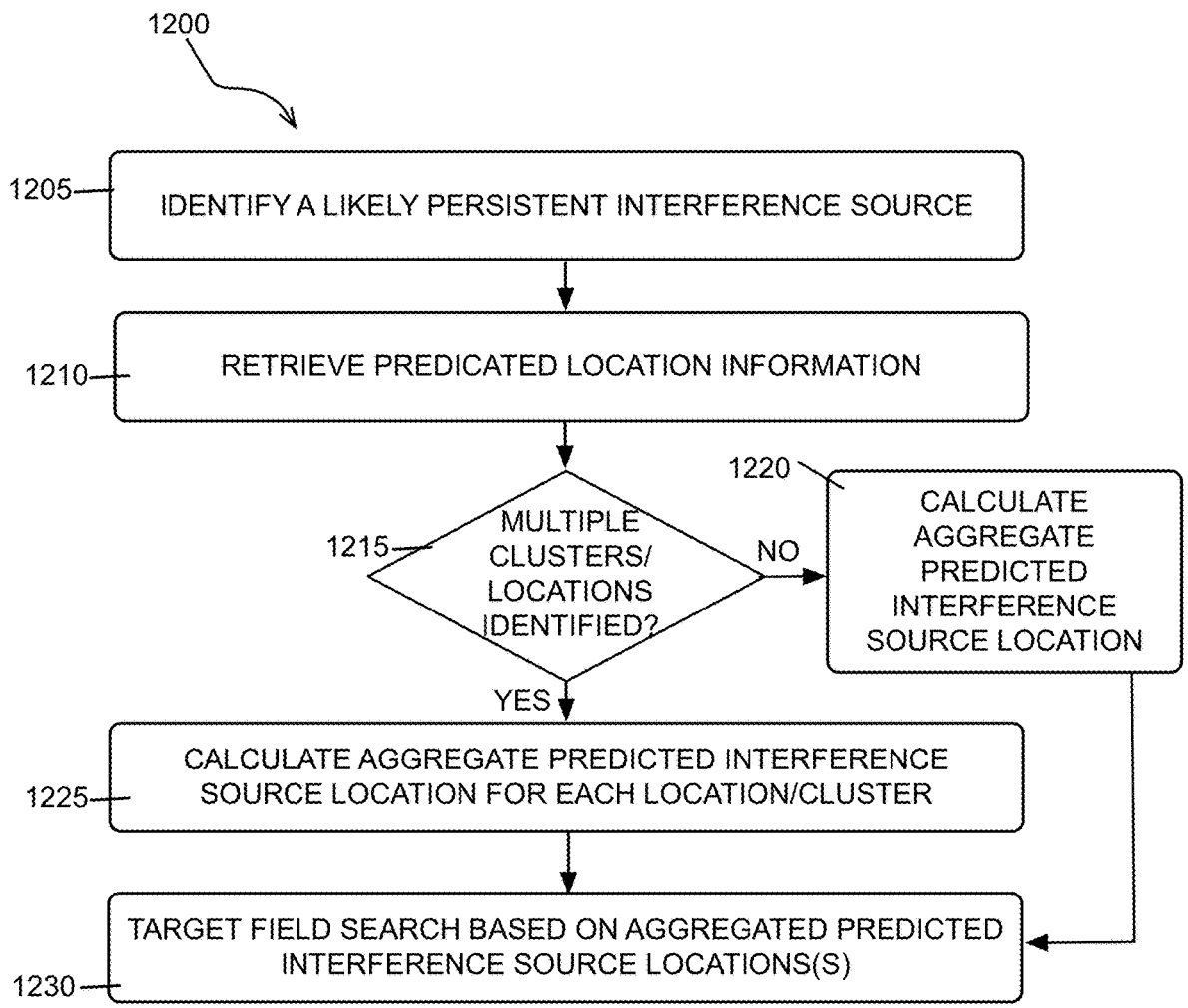
FIG. 12 is a flow diagram illustrating one implementation of a process for refining a predicted interference source location based on historical data, consistent with embodiments described herein.

FIG. 12 illustrates an example process 1200 for further refining predicted interference locations using historical data, consistent with implementations described herein. Such historical refinement allows for fluctuations in interference-related KPI data for affected PRBs that may cause corresponding fluctuations in the output of processes 400, 700, and 1100 described above. In some embodiments, process 1200 may be performed by interference detection system 215. In some embodiments, process 1200 may be performed by, or in conjunction with, one or more other devices or systems, such as wireless station database 210, and/or interference reporting system 220.

Process 1200 may begin by identifying likely persistent or constant interference sources, referred to as a persistent interferers (block 1205). For example, interference detection system 215 may retrieve interference information, such as that determined and generated in process 400 described above, for a predetermined time interval, such as a three-day period. For example, process 400 described above may be performed on a daily basis using, for example, PRB information from affected wireless stations 100. The collected information may be used to determine or identify persistent interferers, that is, likely interference sources that induce interfering effects on one or more wireless stations consistently over the period of time.

Once one or more possible persistent interferers has been identified, information regarding the predicted locations for the interference source are retrieved or collected for the selected period of time (block 1210). Consistent with implementations described herein, results of periodic (e.g., daily) interference source location processing (e.g., processes 400) may be collected or aggregated, such as in a database or similar storage, for subsequent retrieval. In block 1210, the predicted interference source locations for each stored interval (e.g., day) may be retrieved for a selected interval (e.g., a particular three-day period, etc.).

As described above, predicted interference source locations for a particular interference incidence are determined based on scores for each of a number of possible interference source locations (e.g., resulting from block 425 described above). Because process 400 described above identifies a number of multiple possible locations, each having a score, in some implementations, a singular predicted location for a particular incident period (e.g., a single day) may be determined using a centroid(s) of the cluster(s) of possible locations. For example, a weighted centroid may be calculating based on the scores of the possible locations used in process 400. In other embodiments, a simple centroid of the estimated locations (i.e., unweighted) that have scores above a predefined threshold may be calculated to represent the singular predicted location for the particular incident period. In still other implementations, rather than basing the singular predicted location on the cluster of estimated locations, a highest scoring location may be identified as the singular predicted location for the particular incident period.

Next, it is determined whether multiple interference source locations have been identified (block 1215). For example, in some implementations, it is possible that more than one persistent interferer are causing the identified interference effects. This may be indicated when processes 400/1100 identify multiple scored clusters, each having a unique centroid or singular predicted location. As described above, each identified cluster may correspond to a predicted interference source location for the particular interval (e.g., day).

If it is determined that only a single predicted interference source location has been identified (block 1215—NO), an aggregated predicted interference source location is calculated based on the predicted interference locations for each interval (e.g., day) in the selected historical time period (e.g., 30 days) (block 1220). Consistent with implementations described herein, an exemplary methodology for calculating an aggregated predicted interference source location includes k-means clustering using each of the retrieved singular predicted locations, wherein k is set equal to 1. For example, a centroid location identified as singular predicted interference source location for each day in the three-day time period may be used to generate a single aggregated predicted interference source location corresponding to the centroid of the cluster of daily results.

If it is determined that multiple interference source locations have been identified (block 1215—YES), multiple aggregated predicted interference source locations are calculated based on the multiple predicted interference locations for each interval (e.g., day) in the selected historical time period (e.g., 3 days) (block 1225). For example, k-means clustering may be performed in which the value of k is set equal to the discrete number of interference source locations that have been identified for each day. For example, if two clusters were identified for a particular interference incident, as reflected by the retrieved information including two, discrete, singular predicted interference locations (e.g., centroids of the clusters), k is set equal to 2, and the k-means processing results in two aggregated predicted interference source locations.

Once the one or more aggregated predicted interference source locations are identified, field searching may be targeted based on the resulting location(s) (block 1230).

Figure 13:
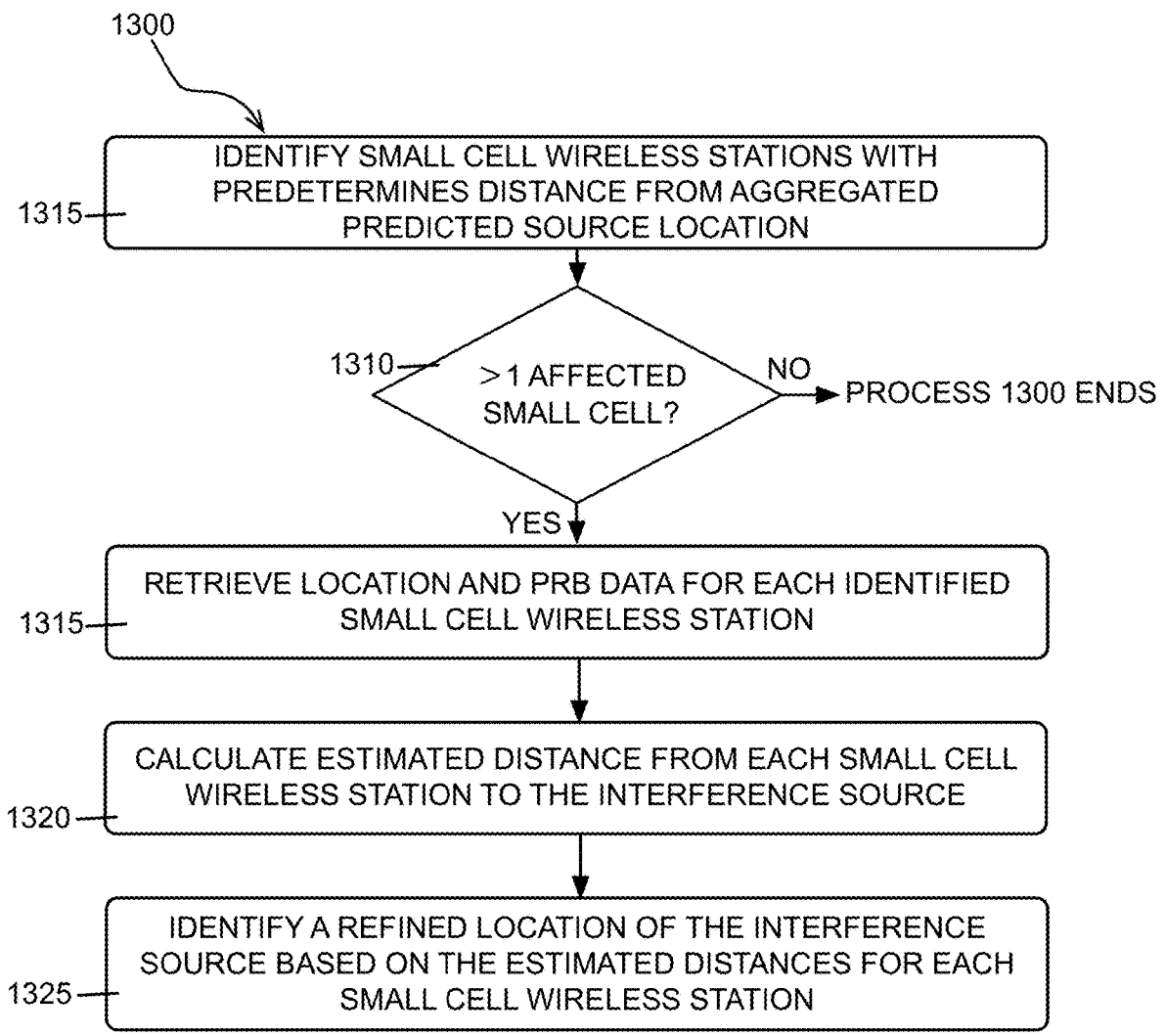
FIG. 13; is a flow diagram illustrating one implementation of a process for further refining a predicted interference source location.

FIG. 13 illustrates an example process 1300 for refining the aggregated predicted interference source location from process 1200 using information associated with one or more small cell wireless stations, consistent with implementations described herein. As with the processes described above, process 1300 may be performed by interference detection system 215, alone or in conjunction with one or more other devices or systems, such as wireless station database 210, and/or interference reporting system 220.

In some implementations, RAN 205 may include a particular type or category of wireless stations 100 that are referred to as "small cells." In general, small cell wireless stations refer to wireless stations having an antenna volume of less than three cubic feet, and which are mounted 50 feet or less in height relative to the height of a structure on which it is mounted, or the ground if the wireless station is free standing. In addition, small cell wireless stations generally have a shorter range, due to their lower height and decreased antenna volume. Although variations exist, many small cell wireless stations include omnidirectional antennas.

Consistent with implementations described herein, process 1300 may identify small cell wireless stations within a predetermined distance from the aggregated predicted interference source location calculated in process 1200 (block 1305). For example, a distance of approximately 2-3 miles may provide a suitable distance for identifying affected small cell wireless stations. For example, interference detection system 215 may retrieve locations of small cell wireless stations from wireless station database 210 and may compare the retrieved locations to the aggregated predicted interference source location from process 1200.

At block 1310, the process determines whether at least two of the identified small cell wireless stations are affected by the interferer. For example, for any identified small cell wireless stations within the predetermined distance, interference detection system 215 may determine whether it has been affected by the interference under analysis. For example, as described above in relation to process 400, affected wireless stations associated with an interference event are identified at block 410.

If it is determined that two or more such small cell wireless stations are not within the predetermined distance of the aggregated predicted interference source location (block 1310—NO), process 1300 terminates. However, if it is determined that two or more such small cell wireless stations are within the predetermined distance from the aggregated predicted interference source location (block 1310—YES), the location and PRB data for each location are retrieved (e.g., from wireless station database 210) (block 1315) and an estimated distance from each of the identified small cell wireless stations to the interference source is calculated (block 1320). For example, an FSPL calculation may be performed for each of the two or more small cell wireless station locations based on, in some implementations, the RF frequency of the PRB under investigation, and, for example, and average uplink interference level value at the small cell wireless station over the particular time interval (e.g., 3 days) under investigation. Based on the estimated distance values for each small cell wireless station, a refined predicted location of the interference source is determined (block 1325).

Figure 14A:
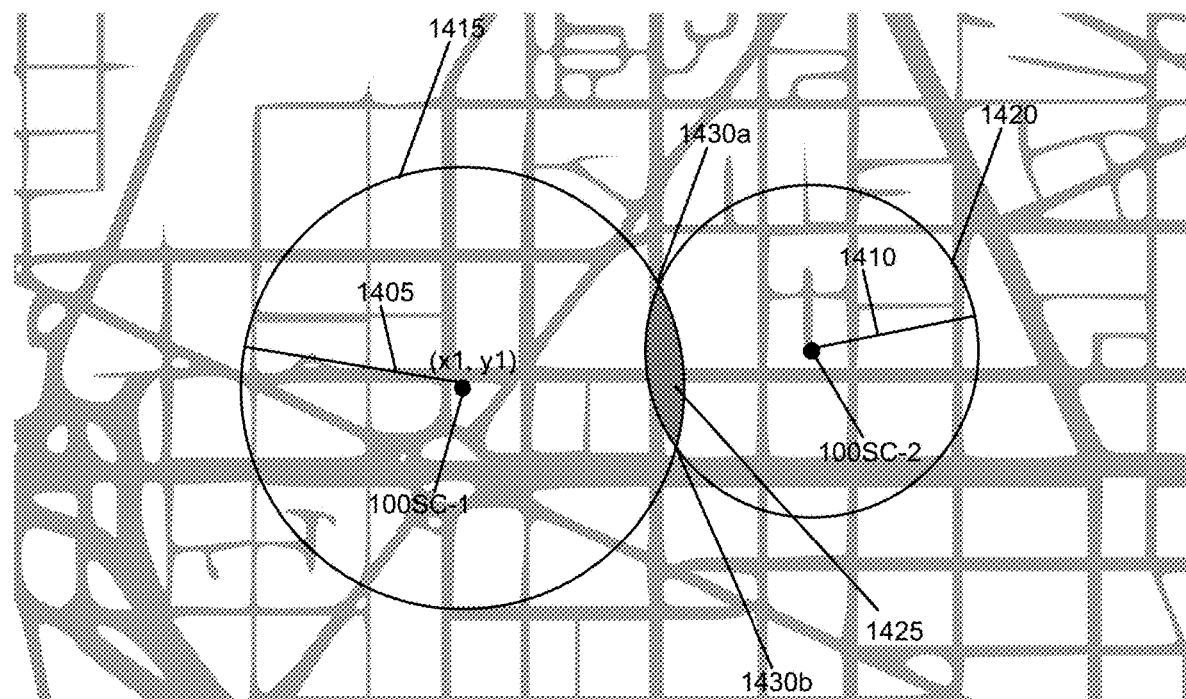
FIGS. 14A and 14B are graphical depictions of a trilateration methodology consistent with implementations described herein.
Figure 14B:
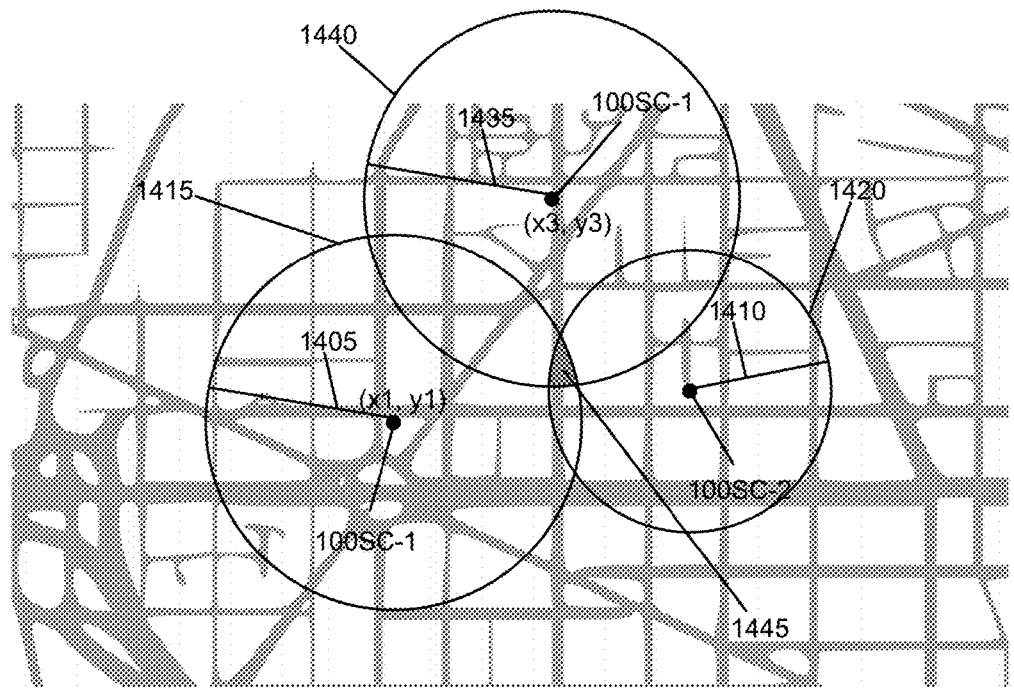

For example, consistent with implementations described herein, a trilateration approach may be used to identify the refined predicted location of the interference source. FIGS. 14A and 14B are graphical depictions of a trilateration methodology consistent with implementations described herein. FIG. 14A depicts trilateration for two small cell wireless stations and FIG. 14B depicts trilateration for three small cell wireless stations.

As shown in FIG. 14A, small cell wireless stations 100SC-1 and 100SC-2 include relative locations (x1,y1) and (x2,y2), which may identify specific geographic coordinates. FSPL is used to calculate the estimated distance from the interference source to each small cell wireless station, as depicted by distances 1405 and 1410, respectively. Circles 1415 and 1420 with radii corresponding to distances 1405 and 1410, respectively, depict the predicted location of the interference source for each small cell wireless station. The area of intersection 1425 between circles 1415 and 1420 generally depicts the refined predicted location of the aggregated interference source. As an additional refinement, in some implementations, the discrete points of intersection 1430a and 1430b between circles 1415 and 1420 may be further identified as possible interference source locations.

FIG. 14B includes a third small cell wireless stations 100SC-3 having a relative location (x3,y3). As in FIG. 14A, FSPL is used to calculate the estimated distance 1435 from the interference source to small cell wireless station 100SC-3. Circle 1440 having a radius corresponding to distance 1435 depicts the predicted location of the interference source for small cell wireless station 100SC-3. The area of intersection 1445 between all three circles, 1415, 1420, and 1440 depicts the refined predicted location of the aggregated interference source.

Although process 1300 is described above with respect to aggregated interference source location determine in process 1200, in other embodiments, process 1300 may be applied to an output of one or more of processes 400 and 1100, to refine a predicted interference source location for an acute interference incident.

The foregoing description of implementations provides illustration and description but is not intended to be exhaustive or to limit the invention to the precise form disclosed. Modifications and variations are possible in light of the above teachings or may be acquired from practice of the invention. For example, while series of blocks and signal messages have been described with respect to FIGS. 5 and 7, the order of the blocks and signal messages may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   determining that an unknown radio frequency (RF) interference source that causes RF interference experienced by a first wireless station is a persistent RF interference source over a plurality of time intervals in a selected time period;
   identifying a predicted interference source location for each time interval in the selected time period; and
   calculating an aggregated predicted interference source location based on the identified predicted interference source locations.

2. The method of claim 1, wherein identifying the predicted interference source location comprises:
   determining a plurality of estimated interference source locations based on at least geographic locations of the first wireless station and one or more second wireless stations, proximate to the first wireless station, that have also experienced interference;
   comparing, for each of the plurality of estimated interference source locations, estimated interference to observed interference at the one or more second wireless stations; and
   identifying the predicted interference source location based on the comparing.

3. The method of claim 2, further comprising:
   identifying one or more clusters based on the comparing of the estimated interference to observed interference at each of the one or more second wireless stations; and
   identifying the predicted interference source location based on the one or more identified clusters.

4. The method of claim 3, wherein the predicted interference source location is identified based on a centroid of the one or more identified clusters.

5. The method of claim 2, wherein calculating the aggregated predicted interference source location based on the identified predicted interference source locations comprises:
   performing k-means clustering based on the identified predicted interference source locations.

6. The method of claim 5, further comprising:
   identifying a number of clusters associated with the identified predicted interference source locations, wherein more than one cluster is indicative of more than one possible unknown interference source; and
   performing the k-means clustering of the identified predicted interference source locations based on the identified a number of clusters.

7. The method of claim 6, further comprising:
   setting a value of k equal to the number of identified clusters.

8. The method of claim 2, further comprising:
   identifying one or more second wireless stations that are small cell wireless stations;
   calculating estimated distances between the unknown RF interference source and each of the identified small cell wireless stations; and
   identifying a refined predicted interference source location based on the calculated estimated distances and relative locations of the identified small call wireless stations.

9. The method of claim 8, further comprising:
   identifying small cell wireless stations that are within a predetermined distance from the aggregated predicted interference source location;
   calculating estimated distances between the unknown RF interference source and each of the identified small cell wireless stations that are within the predetermined distance from the aggregated predicted interference source location; and
   identifying the refined predicted interference source location based on the calculated estimated distances and relative locations of the identified small call wireless stations that are within the predetermined distance from the aggregated predicted interference source location.

10. The method of claim 8, wherein calculating the estimated distances comprises performing free space path loss (FSPL) calculations for each of the identified small cell wireless stations.

11. The method of claim 8, wherein the RF interference comprises RF interference on at least one physical resource block (PRB) on the first wireless station, and wherein identifying the one or more second wireless stations comprises identifying one or more second wireless stations that have experienced similar interference on the at least one PRB.

12. The method of claim 11, comprising:
identifying the RF interference experienced by the first wireless station, wherein the identifying comprises determining that a key performance indicator (KPI) for the at least one PRB on the first wireless station has a value indicative of interference.

13. A network device, comprising:
a processing unit configured to:
determine that an unknown radio frequency (RF) interference source that causes RF interference experienced by a first wireless station is a persistent RF interference source over a plurality of time intervals in a selected time period;
identify a predicted interference source location for each time interval in the selected time period; and
calculate an aggregated predicted interference source location based on the identified predicted interference source locations.

14. The network device of claim 13, wherein the processing unit configured to identify the predicted interference source location is configured to:
determine a plurality of estimated interference source locations based on at least geographic locations of the first wireless station and one or more second wireless stations, proximate to the first wireless station, that have also experienced interference;
compare, for each of the plurality of estimated interference source locations, estimated interference to observed interference at the one or more second wireless stations; and
identify the predicted interference source location based on the comparing.

15. The network device of claim 14, wherein the processing unit is further configured to:
perform k-means clustering based on the identified predicted interference source locations.

16. The network device of claim 15, wherein the processing unit is further configured to:
identify a number of clusters associated with the identified predicted interference source locations, wherein more than one cluster is indicative of more than one possible unknown interference source; and
perform the k-means clustering of the identified predicted interference source locations based on the identified a number of clusters.

17. The network device of claim 14, wherein the processing unit is further configured to:
identify one or more second wireless stations that are small cell wireless stations;
calculate estimated distances between the unknown RF interference source and each of the identified small cell wireless stations; and
identify a refined predicted interference source location based on the calculated estimated distances and relative locations of the identified small call wireless stations.

18. The network device of claim 17, wherein the processing unit is further configured to:
identify small cell wireless stations that are within a predetermined distance from the aggregated predicted interference source location;
calculate estimated distances between the unknown RF interference source and each of the identified small cell wireless stations that are within the predetermined distance from the aggregated predicted interference source location; and
identify the refined predicted interference source location based on the calculated estimated distances and relative locations of the identified small call wireless stations that are within the predetermined distance from the aggregated predicted interference source location.

19. The network device of claim 18, wherein the processing unit configured to calculate the estimated distances between the unknown RF interference source and each of the identified small cell wireless stations that are within the predetermined distance from the aggregated predicted interference source location is further configured to:
perform free space path loss (FSPL) calculations for each of the identified small cell wireless stations.

20. A non-transitory storage medium storing instructions executable by a network device, wherein the instructions comprise instructions to cause the network device to:
determine that an unknown radio frequency (RF) interference source that causes RF interference experienced by a first wireless station is a persistent RF interference source over a plurality of time intervals in a selected time period;
identify a predicted interference source location for each time interval in the selected time period; and
calculate an aggregated predicted interference source location based on the identified predicted interference source locations.

* * * * *